United States Patent
Jacquemard et al.

(10) Patent No.: US 12,392,257 B2
(45) Date of Patent: Aug. 19, 2025

(54) AUXILIARY OIL TANK FOR AN AIRCRAFT TURBINE ENGINE

(71) Applicant: SAFRAN AIRCRAFT ENGINES, Paris (FR)

(72) Inventors: Christophe Paul Jacquemard, Moissy-Cramayel (FR); Didier Gabriel Bertrand Desombre, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 14 days.

(21) Appl. No.: 18/491,888

(22) Filed: Oct. 23, 2023

(65) Prior Publication Data

US 2024/0044289 A1 Feb. 8, 2024

Related U.S. Application Data

(63) Continuation of application No. 17/278,257, filed as application No. PCT/FR2019/052163 on Sep. 17, 2019, now Pat. No. 11,828,231.

(30) Foreign Application Priority Data

Sep. 24, 2018 (FR) ........................................ 1858629

(51) Int. Cl.
*F02C 7/06* (2006.01)
*B64D 27/02* (2006.01)
(Continued)

(52) U.S. Cl.
CPC ................ *F02C 7/06* (2013.01); *B64D 27/02* (2013.01); *F01D 25/18* (2013.01); *F16H 57/045* (2013.01);
(Continued)

(58) Field of Classification Search
CPC . F02C 7/06; B64D 27/02; F01D 25/18; F16H 57/045; F16H 57/0479; F05D 2220/323; F05D 2260/98
See application file for complete search history.

(56) References Cited

U.S. PATENT DOCUMENTS 3,797,561 A * 3/1974 Clark ..................... F28F 3/12
60/39.83
4,137,705 A * 2/1979 Andersen ................. F02C 7/14
60/728

(Continued)

FOREIGN PATENT DOCUMENTS

EP 1925856 A2 5/2008
EP 3327260 A1 5/2018

OTHER PUBLICATIONS

International Search Report and Written Opinion received in corresponding International Application No. PCT/FR2019/052163, filed Sep. 17, 2019, 9 pages.

*Primary Examiner* — Michael A Riegelman
(74) *Attorney, Agent, or Firm* — Christensen O'Connor Johnson Kindness PLLC (57) ABSTRACT

An auxiliary tank for an aircraft turbine engine is provided, and in conjunction with a pump and associated auxiliary lubrication circuit, supplies oil to a reducer when, for example, a phase of free rotation of the fan is detected. Thus, the reducer is always lubricated, even during the phases of free rotation of the fan, thus ensuring a longer life of the reducer gears. The auxiliary tank is arranged with respect to the reducer so that oil is recovered from the reducer at least in part by the auxiliary tank.

13 Claims, 7 Drawing Sheets

(51) Int. Cl.
*F01D 25/18* (2006.01)
*F16H 57/04* (2010.01)

(52) U.S. Cl.
CPC .... *F05D 2220/323* (2013.01); *F05D 2260/98* (2013.01)

(56) References Cited

U.S. PATENT DOCUMENTS

| | | | | |
|---|---|---|---|---|
| 5,245,820 A * | 9/1993 | Zalewski | ............... | F02C 7/277 60/39.08 |
| 7,216,473 B1 * | 5/2007 | McArthur | ............... | F01D 25/18 60/39.08 |
| 7,662,059 B2 * | 2/2010 | McCune | ............... | F01D 25/20 184/6.12 |
| 7,849,668 B2 * | 12/2010 | Sheridan | ............... | F01D 25/20 384/473 |
| 8,113,317 B2 * | 2/2012 | Delaloye | ............... | F01D 25/20 184/6.3 |
| 8,201,662 B2 * | 6/2012 | Delaloye | ............... | F01D 25/20 184/6.3 |
| 8,230,974 B2 * | 7/2012 | Parnin | ............... | F01D 25/18 184/6.11 |
| 8,517,148 B2 * | 8/2013 | Portlock | ............... | F01D 25/18 184/6.12 |
| 8,627,667 B2 * | 1/2014 | Lozier | ............... | B64D 37/04 60/39.08 |
| 9,903,227 B2 * | 2/2018 | Cigal | ............... | F01D 25/18 |
| 10,634,053 B2 * | 4/2020 | Schwarz | ............... | F16H 57/0471 |
| 10,683,774 B2 * | 6/2020 | Chalaud | ............... | F01D 25/20 |
| 11,215,078 B2 * | 1/2022 | Menczykalski | ............... | F01D 25/20 |
| 12,160,156 B2 * | 12/2024 | Cooling | ............... | H02K 11/21 |
| 2002/0083983 A1 * | 7/2002 | Coha | ............... | F02M 37/0094 137/565.22 |
| 2010/0326048 A1 * | 12/2010 | Lozier | ............... | F02K 3/06 60/262 |
| 2012/0103728 A1 * | 5/2012 | Portlock | ............... | F16H 57/0479 184/6.12 |
| 2016/0131034 A1 * | 5/2016 | Chilton | ............... | F01D 25/16 184/6.11 |
| 2016/0160686 A1 * | 6/2016 | Cigal | ............... | F16H 57/045 184/6.11 |
| 2017/0114662 A1 * | 4/2017 | Mastro | ............... | F02C 3/107 |
| 2017/0175874 A1 * | 6/2017 | Schwarz | ............... | F16H 57/0479 |
| 2018/0073395 A1 * | 3/2018 | Parnin | ............... | F16H 57/0442 |
| 2018/0156066 A1 * | 6/2018 | Chalaud | ............... | F01D 25/14 |
| 2018/0321073 A1 * | 11/2018 | Cleyet | ............... | F16H 57/003 |
| 2019/0292944 A1 * | 9/2019 | Mason | ............... | F01M 1/02 |
| 2019/0323597 A1 * | 10/2019 | Sheridan | ............... | F01D 19/00 |
| 2020/0291817 A1 * | 9/2020 | Leque | ............... | F01M 11/064 |
| 2021/0355875 A1 * | 11/2021 | Jacquemard | ............... | F02C 7/06 |
| 2024/0044289 A1 * | 2/2024 | Jacquemard | ............... | B64D 27/02 |
| 2024/0280170 A1 * | 8/2024 | Gravina | ............... | F16H 57/0424 |

* cited by examiner

AUXILIARY OIL TANK FOR AN AIRCRAFT TURBINE ENGINE

CROSS-REFERENCES TO RELATED APPLICATIONS

This application is a divisional of U.S. application Ser. No. 17/278,257, filed Mar. 19, 2021, which is a National Stage of international application number PCT/FR2019/052163, filed Sep. 17, 2019, which claims foreign priority to French application number 1858629, filed Sep. 24, 2018, the contents of which are incorporated herein by reference in their entirety.

TECHNICAL FIELD

The field of the present disclosure is that of aircraft turbomachines, in particular that of the storage of lubrication oil for such turbomachines.

BACKGROUND

A turbomachine, such as a dual flow turbofan engine of an aircraft, typically comprises an air inlet comprising a shrouded fan whose outlet airflow divides into an airflow that enters the engine section and forms a hot flow (or primary flow), and an airflow that flows around the engine section and forms a cold flow (or secondary flow).

The engine part typically comprises, from upstream to downstream in the direction of gas flow, at least one compressor, a combustion chamber, at least one turbine, and an exhaust nozzle in which the combustion gases leaving the turbine (primary flow) are mixed with the secondary flow. A turbomachine may also be of the "double-body" type, which means that it comprises two rotors arranged coaxially. A first body is called a low pressure body and a second body is called a high pressure body. In this case, as is well known, the engine part comprises, from upstream to downstream, a low-pressure compressor, a high-pressure compressor, the combustion chamber, a high-pressure turbine and a low-pressure turbine.

In the case of a turbomachine with reducer, the turbine shaft drives the fan shaft via a speed reducer which reduces the speed of rotation of the fan shaft in relation to that of the turbine shaft.

Depending on the type of reducer used, planetary or epicyclic, the fan shaft will rotate in the same direction or in the opposite direction to the turbine shaft. A planetary or epicyclic reducer comprises each at least one epicyclic gear train (comprising at least one sun gear, one planet carrier, planets and one ring gear) arranged in a defined configuration.

More precisely, an epicyclic reducer comprises, in particular, a fixed ring gear and a planet carrier integral with the fan shaft, each planet gear thus comprising a movable axis of rotation.

The turbine shaft, which is the low-pressure turbine shaft in the case of a double-body turbomachine, is usually coupled to a low-pressure compressor shaft, which in turn is coupled to an input shaft of the reducer. This input shaft is rotationally coupled to the sun gear of the reducer to drive it in rotation.

The fan shaft is, for example, guided in rotation relative to a fixed structure via two bearings which are spaced apart and located upstream of the speed reducer. The input shaft is guided in rotation relative to the fixed structure via a bearing located downstream of the speed reducer.

The reducer is housed in an annular lubrication enclosure and, in the current technology, its operation to ensure the lubrication and the cooling of its pinions and bearings is guaranteed by a supply circuit and a main lubrication circuit of the turbomachine, which requires the turbomachine to operate.

However, during the phases of free rotation of the fan due to the effect of air flows flowing through the fan (called windmilling), the engine does not operate and the supply circuit and the main lubrication circuit does not ensure the lubrication of the reducer, which can lead to seizure or breakage of the toothing of the reducer.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The disclosure aims to solve these drawbacks by offering a solution compatible with all the operating phases of the turbomachine, and in particular those in which the engine does not operate.

For this purpose, the disclosure concerns an auxiliary oil tank and associated auxiliary lubrication circuit for an aircraft turbomachine. In accordance with an aspect of the present disclosure, a method is provided for lubricating a reducer of an aircraft turbomachine, comprising a step of activating the pump so that oil arrives from the auxiliary tank to the reducer as soon as a phase of free rotation of the fan is detected.

Thus, the reducer is always lubricated, even during the phases of free rotation of the fan, thus ensuring a longer life of the reducer gears.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

In this specification, the terms "upstream" and "downstream" are used to refer to the direction of gas flow in an aircraft turbomachine. The terms "inner", "outer", "radial", "axial" are defined in relation to an axis of the centres of curvature of the walls constituting the auxiliary tank according to the disclosure.

Figures 1, 2:
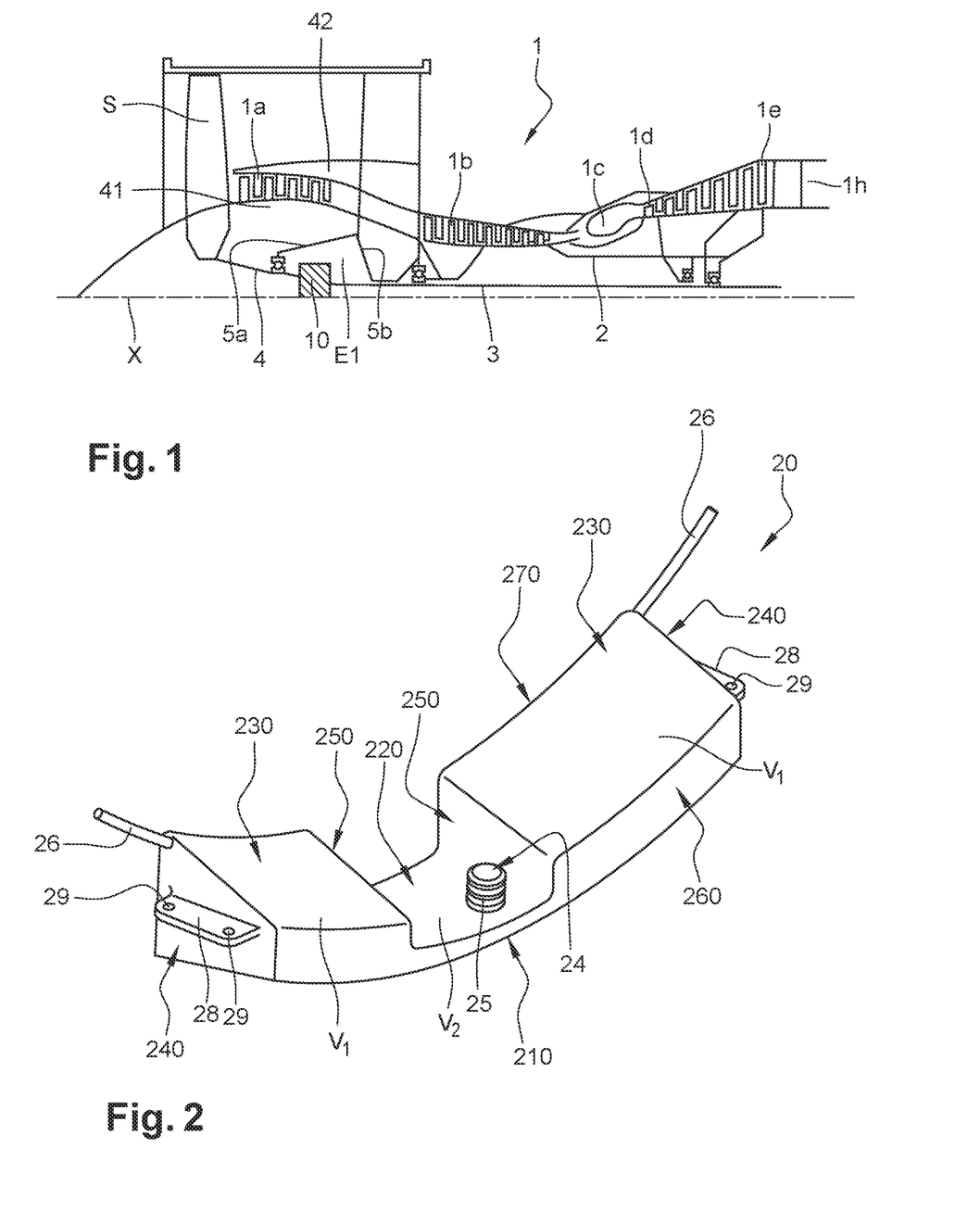
FIG. 1 is a schematic sectional view of a turbomachine.
FIG. 2 is a perspective view of an auxiliary tank according to an embodiment of the disclosure.
Figure 3:
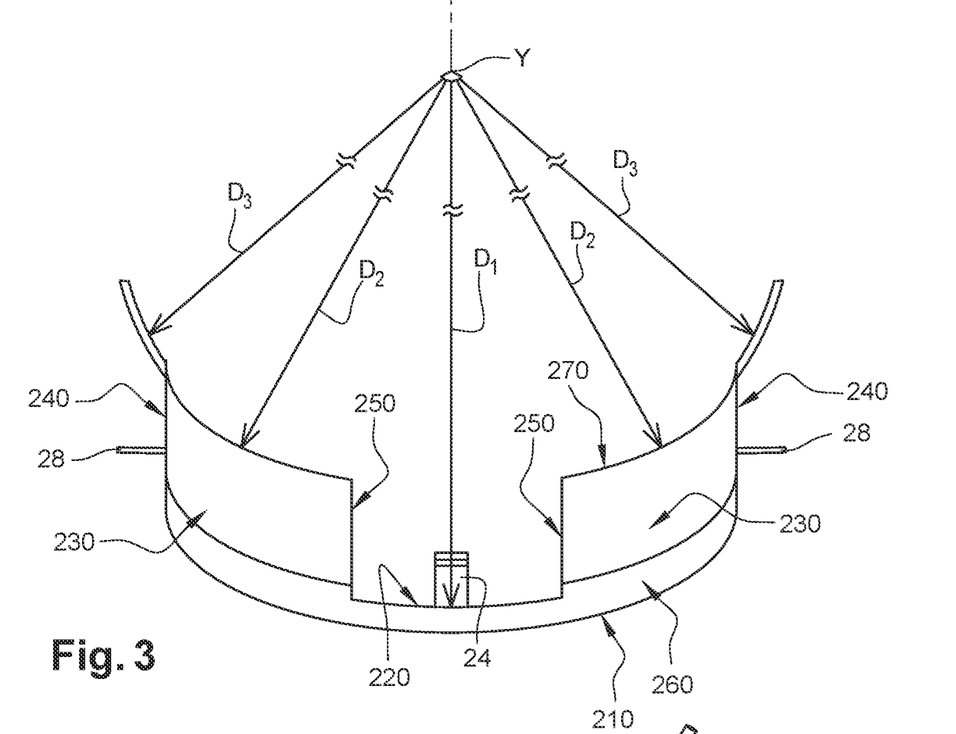
FIG. 3 is a front view of the auxiliary tank.
Figure 4:
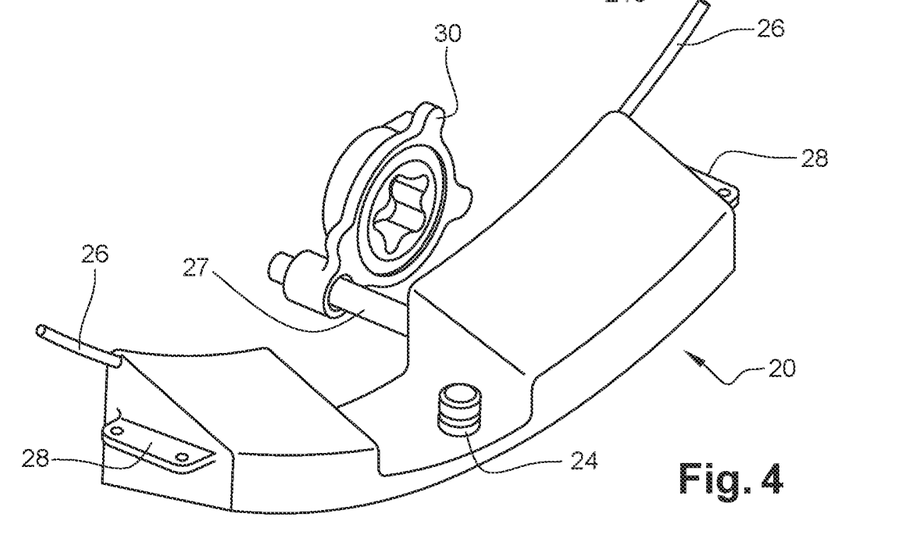
FIG. 4 is a perspective view of the auxiliary tank provided with a lubrication pump.

FIG. 1 shows a turbomachine 1 which comprises, conventionally centred on a longitudinal axis X, a fan S, a low-pressure compressor 1a, a high-pressure compressor 1b, an annular combustion chamber 1c, a high-pressure turbine 1d, a low-pressure turbine 1e and an exhaust nozzle 1h. The high-pressure compressor 1b and the high-pressure turbine 1d are connected by a high-pressure shaft 2 and form with it a high-pressure body (HP). The low-pressure compressor 1a and the low-pressure turbine 1e are connected by a low-pressure shaft 3 and form with it a low-pressure body (LP).

The fan S is driven by a fan shaft 4 which is coupled to the LP shaft 3 by means of an epicyclic gear reducer 10, shown here schematically.

The reducer 10 is positioned in the front part of the turbomachine. A fixed structure, here schematically comprising an upstream part 5a and a downstream part 5b, is arranged to form an enclosure E1 surrounding the reducer 10. This enclosure E1 is closed upstream by seals at a bearing allowing to pass through the fan shaft 4 and downstream by seals at the passing through of the LP shaft 3.

Such a reducer 10 must be lubricated to maintain its gears in good working condition and to guarantee an acceptable service life of the reducer 10 for an aircraft turbomachine. This means that the reducer 10 must be lubricated even when the fan is freely rotating, e.g. due to windmilling caused by the wind through the fan.

The present disclosure therefore proposes to add, on an aircraft turbomachine, for example in the vicinity of the reducer 10, an auxiliary oil tank 20 in addition to a main oil tank known per se. This auxiliary tank could however equip a turbomachine not equipped with a reducer.

Referring to FIG. 2, the auxiliary tank 20 has a curved general or circumferential shape with the radius of curvature centred on an axis Y which is intended to coincide with the longitudinal axis X of the turbomachine 1. This tank comprises one radially outer cylindrical or frustoconical wall 210 and three radially inner cylindrical or frustoconical walls 220, 230.

The radially inner walls 220, 230 are arranged opposite the radially outer wall 210. The three radially inner walls comprise a middle wall 220 and two side walls 230 arranged on either side of the middle wall 220. The middle wall 220 has a larger average radius of curvature D1 than the average radius of curvature D2 of the side walls 230.

The auxiliary tank 20 comprises walls at the circumferential ends 240. Each of these circumferential end walls 240 connects a radially inner side wall 230 to the radially outer wall 210 and forms the side edges of the tank 20.

The auxiliary tank 20 comprises further intermediate radial walls 250. Each of these intermediate radial walls 250 connects a lateral radially inner wall 230 to the middle radially inner wall 220.

The auxiliary tank 20 comprises further walls 260, 270 at the axial ends.

The tank 20 is made of any material with the necessary robustness, it can be flexible or rigid.

This means that the inner volume of the auxiliary tank 20 is approximately U-shaped. Each branch of the U is formed by lateral volume portions between one of the side walls 230, the radially outer wall 210, one of the walls at the circumferential ends 240 and one of the intermediate radial walls 250 extended fictitiously to the radially outer wall 210. The base of the U is formed by a middle volume portion between the middle wall 220, the radially outer wall 210 and a fictitious extension of the intermediate radial walls 250 to the radially outer wall 210.

The auxiliary tank 20 comprises an oil inlet located on the middle wall 220. As illustrated, but by no means limited to, the oil inlet comprises a substantially cylindrical neck 24 protruding from the middle wall 220 and comprising an outer annular groove 25 for receiving a seal, such as an O-ring (not shown).

The lateral volume portions V1 are advantageously connected to gas outlets. According to an embodiment, the gas outlets are formed by curved general shape vent conduits 26, e.g. with the same average radius of curvature D3 as the side walls 230. These vent conduits 26 communicate with the enclosure E1 to ensure the gas flushing when the auxiliary tank 20 is filled with oil.

To enable the auxiliary tank 20 to be attached to an aircraft turbomachine 1 casing, the auxiliary tank 20 also further comprises mounting brackets 28 comprising holes 29 for screw passage. These brackets 28, for example two, are respectively arranged on walls at the circumferential ends 240 and extend circumferentially.

Figure 5:
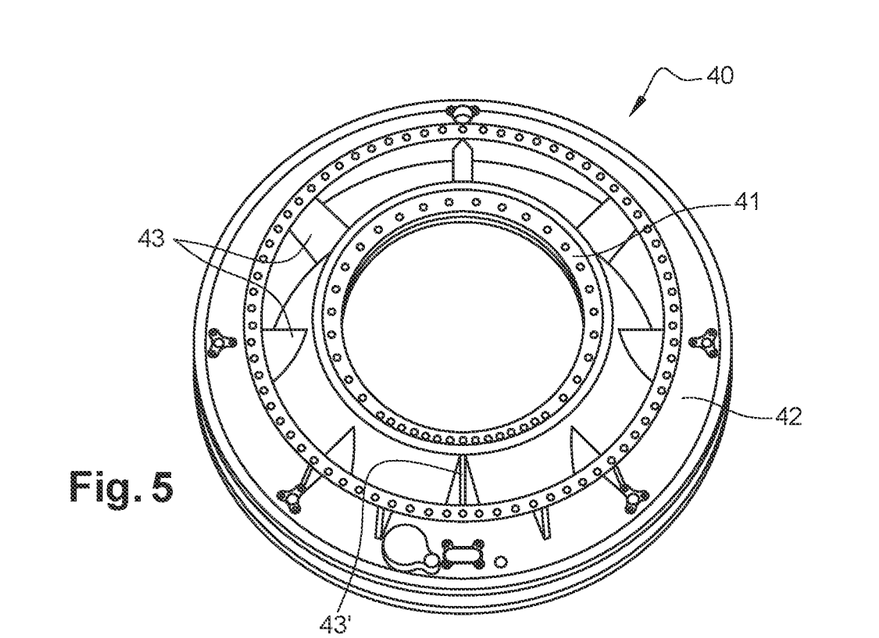
FIG. 5 is a perspective view of the rear side of a turbomachine casing according to an embodiment of the disclosure.

FIG. 5 shows a casing 40 of a turbomachine 1. This casing 40 comprises two coaxial annular walls 41, 42 extending one 41 inside the other 42, and connected together by an annular row of arms 43 which are intended to be swept by a gas flow during operation. At least one 43' of these arms 43 is hollow and comprises fluid passages 44 and 45 defined below. The inner annular wall 41 defines the inner casing 41 of the turbomachine 1 and the outer annular wall 42 defines the inter-duct casing 42 of the turbomachine 1. The inner casing 41 and the inter-duct casing 42 define the entire upstream casing of the turbomachine 1, also referred to as casing 40 in this presentation.

Figure 6:
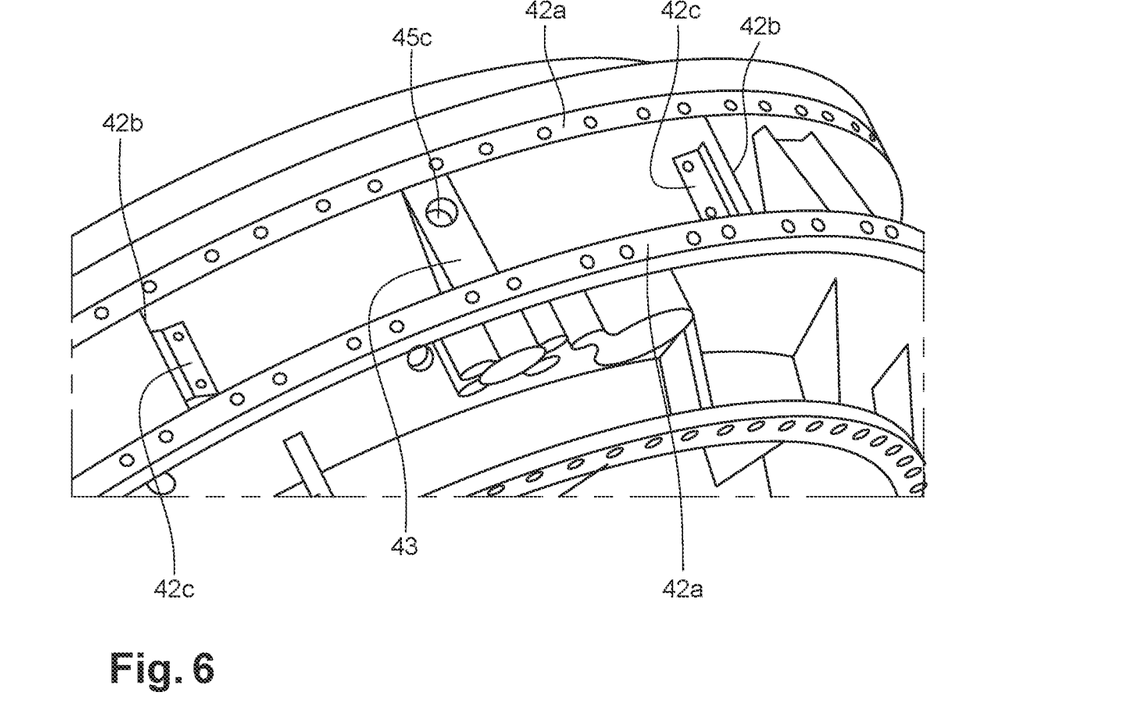
FIG. 6 is a detailed perspective view of the turbomachine casing.

As shown in FIG. 6, the inter-duct casing 42 of the casing 40 comprises two radially outer annular rims 42a connected by stiffening ribs 42b.

Figure 7:
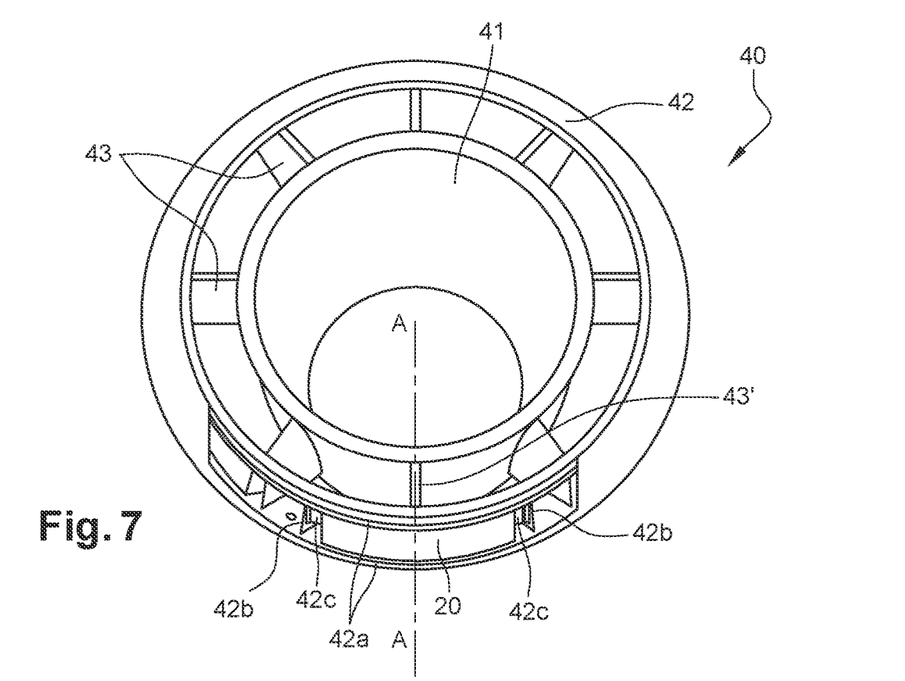
FIG. 7 is a perspective view of the front side of the casing equipped with an auxiliary tank.
Figure 8:
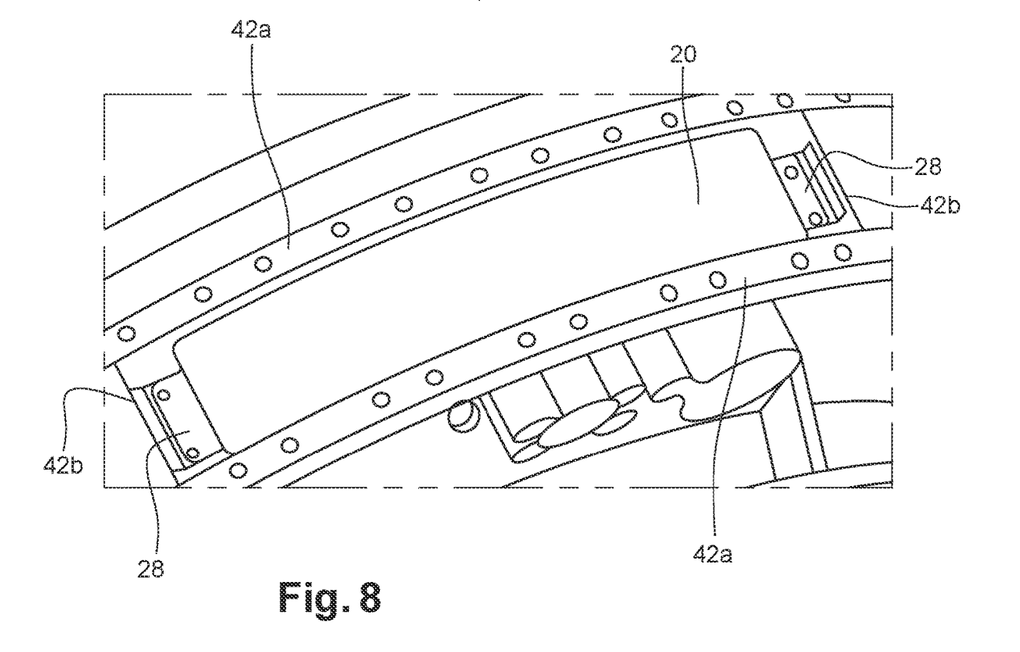
FIG. 8 is a detailed view of an auxiliary tank mounted on the casing of the turbomachine.

The auxiliary tank 20 is mounted between the two radially outer annular rims 42a and between two adjacent stiffening ribs 42b (see FIGS. 7 and 8). The middle wall 220 of the auxiliary tank 20 is then located perpendicularly to the hollow arm 43' and the side walls 230 are located perpendicularly to inter-arm spaces.

In an embodiment, the auxiliary tank 20 according to the disclosure partly takes the shape of the inter-duct casing 42 of the turbomachine 1 and therefore has an adapted shape allowing its integration into the inter-duct casing 42 of the turbomachine 1.

The ribs 42b are provided with circumferentially extending mounting brackets 42c on their faces intended to be arranged opposite the walls 240 of the auxiliary tank 20, when the latter is mounted on the casing 40. The tank 20 is then connected to the casing 40, e.g. by screwing the mounting brackets 28 of the auxiliary tank 20 to the mounting brackets 42c of the casing 40. In another embodiment, not shown, the auxiliary tank 20 is integrated into the casing 40.

Advantageously, as shown in FIG. 7, the tank is angularly positioned at 6 o'clock, with reference to a time dial, (i.e. in the low position) when the casing 40 is mounted on an aircraft turbomachine.

Figure 9:
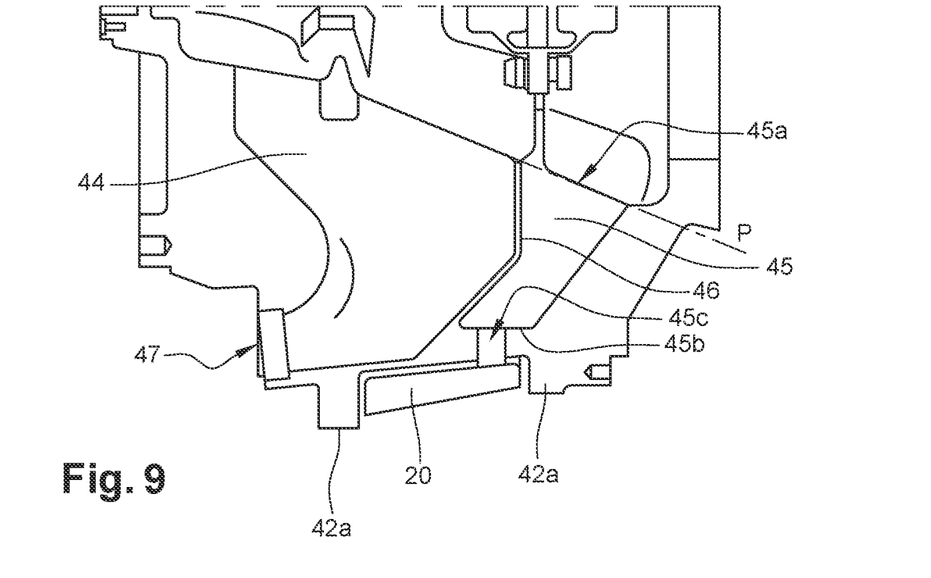
FIG. 9 is a sectional view along the axis A-A of FIG. 7.
Figure 10:
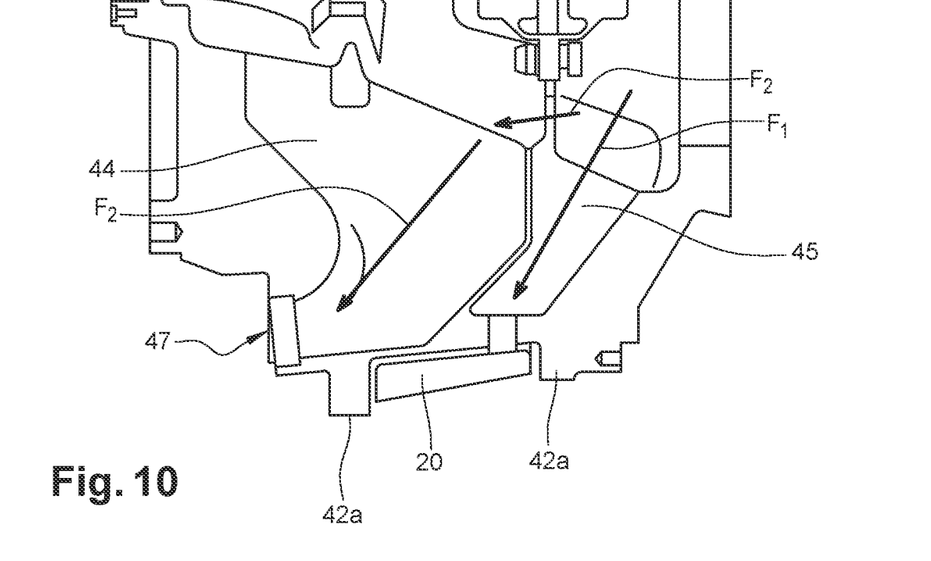
FIG. 10 is a view analogous to FIG. 8 illustrating the lubrication oil path in a turbomachine casing according to an embodiment of the disclosure.

The hollow arm 43' ensures the overall recovery by gravity of lubrication oil from the reducer 10 of the enclosure E1. Referring to FIGS. 9 and 10, the hollow arm 43' comprises a first inner passage 44 of oil recovery and a second inner passage 45 of oil recovery. The first and second passages 44, 45 of oil recovery are formed in the inter-duct casing 42 of the casing 40. They are for example formed by two channels separated by a partition 46 and arranged side by side in a plane passing through the axis of revolution of the inner casing 41 and the inter-duct casing 42.

The first passage 44 is, in a manner known per se, connected to a main oil tank (not shown) and ensures the passage of oil to various parts of the turbomachine such as, for example, the rolling elements of the line shafts of the turbine, the compressor, the fan, etc.

The main oil tank is connected to a main lubrication circuit which provides lubrication for the reducer 10 when the turbomachine is active.

The second passage 45 of oil recovery has a non-rectilinear shape, e.g. V-shaped. It comprises an opening 45a and a base 45b comprising a hole 45c for engaging the neck 24 of the tank 20.

The second inner passage 45 of oil recovery is configured to allow the recovered oil to be conveyed from the enclosure E1 to the auxiliary tank 20.

Specifically, after lubricating the reducer 10, for example, during normal operation of the turbomachine in which the engine is running, the lubrication oil is drained into the hollow arm 43', it then flows into the passage 45 as shown in FIG. 10 by the arrow F1. In this way, the tank is supplied continuously and spontaneously. When the auxiliary tank 20 is filled, the passage 45 is filled with lubrication oil, which then overflows into the passage 44 to be discharged through the hole 47 to a general oil recovery as shown by the arrows F2 and the main oil tank known per se (not shown).

Advantageously, the opening 45a of the second passage 45 is opposite to the auxiliary tank 20 and extends in a plane P which is intended to be inclined from upstream to downstream downwards when the turbomachine 1 is substantially horizontal.

The tank 20 and the casing 40 thus configured, and in particular the recovery passage 45, make it possible to maintain a sufficient oil level in the auxiliary tank 20, even under the effect of a negative inclination of the turbomachine 1, or under the effects of rolling of the latter.

The auxiliary tank 20 is associated with an auxiliary lubrication circuit (not shown). Thus, the auxiliary tank 20 together with the auxiliary lubrication circuit is an independent unit from the main lubrication circuit and allows the reducer 10 to be lubricated when the main lubrication circuit is not active, for example during particular windmilling operating phases with the turbomachine switched off and the main lubrication circuit not active, thus not requiring the main lubrication circuit to be activated specifically in these particular operating phases of the turbomachine.

The dimensions of the auxiliary tank 20 are such that it contains a sufficient volume of oil to meet the lubrication requirements of the reducer 10 according to the turbomachine during the operating phases of the auxiliary tank 20.

Figure 11:
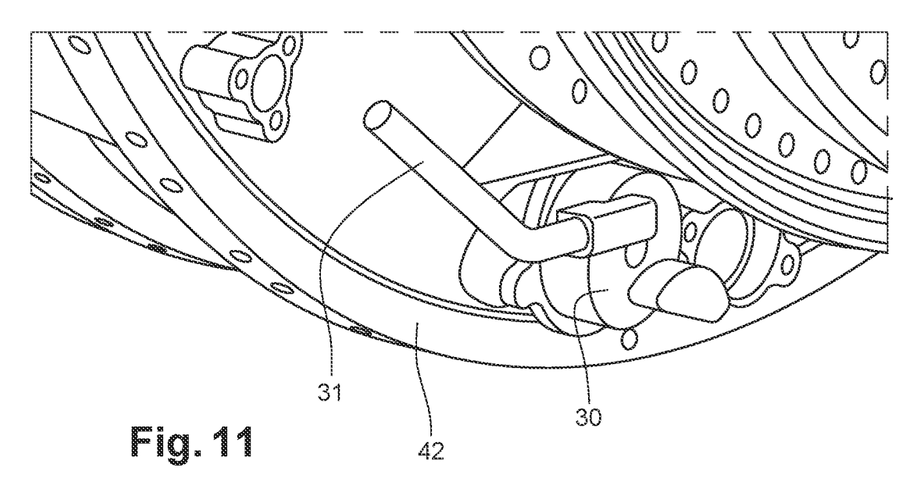
FIG. 11 is a detailed perspective view illustrating the lubrication pump mounted on the turbomachine casing.
Figure 12:
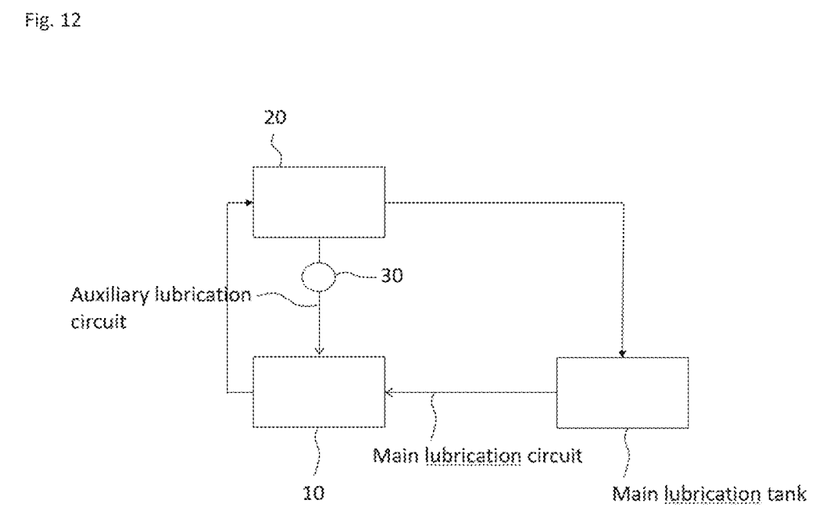

The tank also comprises an oil outlet connected by a hose 27 to a pump 30 powered for example by an electric motor (not shown). As shown in FIG. 11, the pump 30 is attached to the casing 40.

The present disclosure also relates to a method for lubricating a reducer 10 of a turbomachine 1 comprising a casing 40 equipped with an auxiliary tank 20.

When a free rotation phase of the fan S is detected, the pump 30 is activated, for example by the electric motor. The lubrication oil is then taken from the auxiliary tank 20 via the oil outlet hose 27 and is conveyed to the reducer 10 or other components requiring lubrication, for example such as bearings, via a hose 31 at the outlet of the pump 30 and via the auxiliary lubrication circuit.

The auxiliary tank 20, the casing 40 and the lubrication method according to the disclosure are thus configured so that the reducer 10 is always lubricated, regardless of the flight altitudes and the operating phases of the turbomachine.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. A method of lubricating a reducer of an aircraft turbomachine, the aircraft turbomachine having a main tank and a main lubrication circuit configured to lubricate the reducer when the turbomachine is active and having an auxiliary tank and an auxiliary lubrication circuit configured to lubricate the reducer when the turbomachine is not active, the method comprising:
   detecting a phase of free rotation of a fan of the turbomachine; and thereafter,
   activating a pump associated with the auxiliary lubrication circuit so that oil is supplied to the reducer from the auxiliary tank, and
   filling the auxiliary tank with oil recovered from the reducer when the turbomachine is active, and when the auxiliary tank is full, filling the main tank with oil that overflows from the auxiliary tank.

2. The method of claim 1, further comprising
   lubricating, via the main lubrication circuit, the reducer with oil when the turbomachine is active.

3. The method of claim 2, further comprising
   filling the auxiliary tank with oil from the main lubrication circuit when the turbomachine is active.

4. The method of claim 1, wherein the reducer is connected in fluid communication with the auxiliary tank and the auxiliary lubrication circuit, and wherein the reducer is connected in fluid communication with the main lubrication tank and the main lubrication circuit.

5. The method of claim 1, further comprising
   recovering oil from the reducer into the auxiliary tank and into the main lubrication tank.

6. The method of claim 5, wherein when the auxiliary tank is filled with oil recovered from the reducer, the oil overflows into a passage connected in fluid communication with the main lubrication tank.

7. A method of lubricating a reducer of an aircraft turbomachine, comprising:
- lubricating, via a main lubrication circuit, the reducer when the turbomachine is active; and
- lubricating, via an auxiliary lubrication circuit, the reducer when the turbomachine is not active, the main lubrication circuit comprising a main lubrication tank and the auxiliary lubrification circuit comprising an auxiliary lubrication tank,
- filling the auxiliary tank with oil recovered from the reducer when the turbomachine is active, and when the auxiliary tank is full, filling the main tank with oil that overflows from the auxiliary tank.

8. The method of claim 7, wherein the reducer is connected in fluid communication with the auxiliary tank and the auxiliary lubrication circuit, and wherein the reducer is connected in fluid communication with the main lubrication tank and the main lubrication circuit.

9. The method of claim 8, further comprising
- detecting a phase of free rotation of a fan of the turbomachine; and thereafter,
- activating a pump associated with the auxiliary lubrication circuit so that oil is supplied to the reducer from the auxiliary tank.

10. A method of lubricating a reducer of an aircraft turbomachine having an auxiliary tank having a curved shape with a radius of curvature centered on a centering axis corresponding to a longitudinal axis of the turbomachine, the turbomachine further having a reducer, a main lubrication oil tank, a main lubrication circuit, an auxiliary lubrication circuit, and an oil outlet connected to a pump, the method comprising:
- lubricating, via the main lubrication circuit, the reducer when the turbomachine is active; and
- lubricating, via the auxiliary lubrication circuit, the reducer when the turbomachine is not active by activating the pump so that oil is supplied from the auxiliary tank to the reducer as soon as a phase of free rotation of a fan of the turbomachine is detected, and
- filling the auxiliary tank with oil recovered from the reducer when the turbomachine is active, and when the auxiliary tank is full, filling the main tank with oil that overflows from the auxiliary tank.

11. The method of claim 1, wherein the auxiliary tank has a curved shape with a radius of curvature centered on a centering axis corresponding to a longitudinal axis of the turbomachine, the auxiliary tank comprising:
- a cylindrical or frustroconical radially outer wall,
- three cylindrical or frustroconical radially inner walls arranged opposite said radially outer wall, and
- an inner volume forming a U-shape enclosed by the radially outer wall and the radially inner walls.

12. The method of claim 11, wherein the radially inner walls comprise a middle wall and two side walls arranged on either side of the middle wall, the middle wall has a mean radius of curvature greater than a mean radius of curvature of the two side walls.

13. The method of claim 12, the U-shape of the inner volume has a base and a plurality branches, the plurality of branches are formed by lateral volume portions between the two side walls and the radially outer wall, and wherein the base is formed by a middle volume portion between the middle wall and the radially outer wall.

* * * * *